United States Patent [19]
Tanaka et al.

[11] Patent Number: 5,933,613
[45] Date of Patent: Aug. 3, 1999

[54] COMPUTER SYSTEM AND INTER-BUS CONTROL CIRCUIT

[75] Inventors: Toshio Tanaka, Ebina; Kazuhisa Ishida, Owariasahi; Tetsuro Kiyomatsu, Seto; Shigeo Tsujioka, Fujisawa, all of Japan

[73] Assignee: Hitachi, Ltd., Tokyo, Japan

[21] Appl. No.: 08/675,118

[22] Filed: Jul. 3, 1996

[30] Foreign Application Priority Data

Jul. 6, 1995 [JP] Japan .................................. 7-170673

[51] Int. Cl.⁶ ........................... G06F 13/24; G06F 13/40
[52] U.S. Cl. ........................ 395/308; 395/287; 395/306
[58] Field of Search .................................. 395/287, 306, 395/308, 309, 310, 280, 289, 290

[56] References Cited

U.S. PATENT DOCUMENTS

| | | | |
|---|---|---|---|
| 4,935,894 | 6/1990 | Ternes et al. ............................ | 395/308 |
| 5,317,747 | 5/1994 | Mochida et al. ........................ | 395/733 |
| 5,379,384 | 1/1995 | Solomon ................................. | 395/308 |
| 5,535,341 | 7/1996 | Shah et al. .............................. | 395/306 |
| 5,548,730 | 8/1996 | Young et al. ............................ | 395/280 |
| 5,555,383 | 9/1996 | Elazar et al. ............................ | 395/306 |
| 5,594,882 | 1/1997 | Bell ......................................... | 711/212 |
| 5,632,021 | 5/1997 | Jennings et al. ........................ | 395/309 |
| 5,649,161 | 7/1997 | Andrade et al. ........................ | 395/305 |
| 5,673,400 | 9/1997 | Kenny .................................... | 395/309 |
| 5,696,949 | 12/1997 | Young .................................... | 395/551 |

OTHER PUBLICATIONS

DEC Chip 21050 PCI–to–PCI Bridge Data Sheet, pp. 1–3—1–5, published by Digital Equipment Corporation. (1993).

*Primary Examiner*—Ayaz R. Sheikh
*Assistant Examiner*—Xuong Chung-Trans
*Attorney, Agent, or Firm*—Fay,Sharpe,Beall,Fagan,Minnich & McKee

[57] ABSTRACT

In a computer system having a double PCI bus configuration, an inter-bus control circuit for relaying a first PCI bus and a second PCI bus is provided with a memory control mechanism common to devices connected to the second PCI bus and an interrupt control mechanism for controlling interrupts between local processors, in addition to a control function for controlling the buses. The inter-bus control circuit having the above mechanisms can be implemented by a single-chip integrated circuit. The integrated inter-bus control circuit prevents the use of a plurality of identical decoder circuits, an increase in the number of parts, and an increase in mounting area, thus providing a compact and low price computer system.

22 Claims, 4 Drawing Sheets

COMPUTER SYSTEM AND INTER-BUS CONTROL CIRCUIT

BACKGROUND OF THE INVENTION

The present invention relates to an inter-bus control circuit for relaying a plurality of extended buses in a small computer such as a personal computer and to a computer system having the control circuit.

In recent years, personal computers have been becoming remarkably popular, and significant changes have been made to extended buses for communicating information between a CPU and a variety of input/output devices and improvements have been gained in performance of the CPU. Conventionally, a standard called the ISA (Industry Standard Architecture) bus has been generally adopted as for the extended bus used in personal computers. Thus, a variety of expansion boards based on this standard have been made commercially available in the market.

While faster processing of the CPU has been accomplished by the improved performance of the CPU, the data transfer speed between a CPU and an input/output device has not so increased as long as the ISA bus is employed. It is therefore necessary to employ a faster extended bus in order to improve the processing performance of an entire system.

A standard for such a faster extended bus recently drawing attention is a bus standard called PCI (Peripheral Component Interconnection) which has been established as a standard with Intel Corporation, U.S.A., as the leader.

The PCI bus has advantages as compared with the ISA bus because of in a faster data transfer capability, a resource collision avoidance capability provided by an automatic relocation mechanism of a memory space, an I/O space by configuration functions, and so on, so that it is highly possible that the PCI bus will be adopted in the future as an input/output bus for high performance small computers such as work stations as well as personal computers.

The PCI bus standard defines an upper limit to the number of devices and expansion slots connected to a bus in order to prevent erroneous operations possibly due to deteriorated electrical characteristics caused by a high operating frequency. Thus, a plurality of PCI buses must be configured for providing a system with a number of devices and expansion slots in order to exceed the upper limit. As an approach for configuring a plurality of PCI buses, "PCI to PCI Bridge Architecture Specification" has been proposed by PCISIG.

This proposal describes a guideline about a control scheme for a bridge circuit for relaying a first PCI bus (primary bus) and a second PCI bus (secondary bus) when a plurality of PCI buses are configured. A similar technique is also described in detail in a data book for a PCI-PCI bridge chip, "DEC chip 21050 PCI-to-PCI Bridge Data Sheet", pp 1-3-1-5, published by Digital Equipment Corporation.

FIGS. 2A and 2B illustrate a conventional computer system having a double bus configuration and a conventional PCI-PCI bridge, respectively. In FIG. 2A, the system comprises a CPU 1; a memory 2; a bus/memory controller 3 for performing a conversion from a local bus 100 of the CPU 1 (hereinafter called the "processor bus") to a first PCI bus 200, an access control of the memory 2, and so on; a PCI-PCI bridge circuit (1) 4 for relaying the first PCI bus 200 and a second PCI bus 201; and another PCI-PCI bridge circuit (2) 5 for relaying the second PCI bus 201 and a third PCI bus 202. PCI devices for controlling a variety of input/output devices are connected to the respective PCI buses.

For example, a configuration assumed here may be such that PCI devices 6, 7 connected to the first PCI bus 200 are controllers for controlling a display and a file storage unit (though not illustrated), and PCI devices 8, 9 connected to the third PCI bus 202 may be controllers for controlling a communication network. The PCI-PCI bridge circuit 2 (5) and the PCI devices 8, 9 are connected to the second PCI bus 201 through a connector 10.

In this way, the connection between the processor bus 100 and the plurality of PCI buses 200–202 is realized in a hierarchical configuration. It should be noted that, although not illustrated, commercially available controllers and expansion boards for the ISA bus may also be used in the system of FIG. 2A through a PCI-ISA bridge circuit for the conversion between the PCI bus and the conventional ISA bus.

Each of these bridge circuits are generally composed of one or a plurality of LSI's.

The PCI-PCI bridge circuits 4, 5 are actually implemented by the same LSI which has an internal configuration as illustrated in FIG. 2B. More specifically, a portion for interfacing with the first PCI bus (primary bus) is connected to a primary target unit 41 and a primary master unit 43, while a portion for interfacing the second PCI bus (secondary bus) is connected to a secondary master unit 42 and a secondary target unit 44.

Further, the PCI-PCI bridge circuit includes a configuration register 45 for setting a PCI space and so on based on the PCI bus standard, a data buffer used for receiving and passing bus cycles of both buses, and so on.

When a device connected to the secondary bus is accessed by a device connected to the primary bus (for example, the bus/memory controller 3), the primary target unit 41 in the PCI-PCI bridge circuit 4 receives the access and passes it to the secondary master unit 42 which in turn generates a bus cycle as an access on the secondary bus.

Similarly, when a device connected to the primary bus is accessed by a device connected to the secondary bus, the secondary target unit 44 in the PCI-PCI bridge circuit 4 receives the access and passes it to the primary master unit 43 which in turn generates a bus cycle as an access on the primary bus.

In this way, since a plurality of PCI buses can be configured in a single system through the PCI-PCI bridge circuit performing the relay function, the system can be provided with a larger number of PCI devices and expansion slots.

However, the foregoing PCI-PCI bridge circuit merely receives and passes accesses between the first PCI bus and the second PCI bus. More specifically, the PCI-PCI bridge circuit merely receives a bus cycle generated on one bus as a target and generates a bus cycle as a bus master on the other bus.

With this configuration, the second PCI bus must be provided with dedicated control circuits connected thereto, each for incorporating a memory control mechanism common to devices connected to the second PCI bus, an inter-processor interrupt control mechanism required when a plurality of local processors are connected thereto, and so on. Thus, the respective control circuits will have their own circuits for decoding a bus cycle and so on, so that the scale of logical gates is increased in the entire configuration. Also, since the respective control circuits are formed of separate integrated circuits, the number of parts and an area required to mount these parts on a board are also increased. Thus, the conventional PCI-PCI bridge circuit has a problem in that the number of parts and required substrate area is increased, resulting in the need for larger expansion cards and consequently an increased cost of the entire system.

SUMMARY OF THE INVENTION

It is an object of the present invention to solve the above-mentioned problems in a computer system having a double bus configuration and to provide an inter-bus control circuit for this purpose.

It is another object of the present invention to reduce the logical circuit scale in an entire computer system by effectively utilizing a decoder circuit and so on, essential to an inter-bus control circuit for inter-bus connection, to avoid the use of a plurality of identical circuits.

It is a further object of the present invention to provide a computer system having a double bus configuration at a low cost.

Other objects of the present invention will become apparent from the following detailed description.

To achieve the above objects, an inter-bus control circuit used in a computer system according to the present invention internally has, in addition to a function of relaying a first PCI bus and a second PCI bus, a memory control mechanism common to devices connected to the second PCI bus and an interrupt control mechanism for controlling interrupts between local processors.

More specifically, the inter-bus control circuit, upon receiving a bus cycle from one of the first and second buses, determines whether the bus cycle is an access to a device connected to the other bus or an access to a shared memory allocated to a memory space of the PCI bus.

Based on the determination result, the inter-bus control circuit receives the bus access as a target device if the bus cycle is an access from a device connected to one of the first and second buses to a device connected to the other bus, and generates a bus cycle on the other bus as a bus master device.

If the determination result shows that the bus cycle is an access to the shared memory, the inter-bus control circuit responds to the bus cycle as a target device and accesses the shared memory.

Also, if a device (local processor) on the second bus is accessed, the inter-bus control circuit utilizes a dedicated register, provided internal thereto, to generate an interrupt to the device on the second bus in accordance with a set value in the register.

In computer systems having a double bus configuration, the inter-bus control circuit essentially requires circuits for decoding a bus cycle and so on without exception. In the present invention, the inter-bus control circuit is provided with the common memory control mechanism and the interrupt control mechanism, so that a single decoder circuit for decoding a bus cycle and so on can be shared by these mechanisms.

Also, the inter-bus control circuit is additionally provided with a function of determining from the result of decoding a bus cycle whether the bus cycle is an access to the shared memory or to any other device, so that the memory control mechanism and the interrupt control mechanism can be integrated in the inter-bus control circuit in the form of a single chip. This integration also contributes to reducing the number of parts and a mounting area for the parts in the computer system.

DESCRIPTION OF THE PREFERRED EMBODIMENT

Figure 1:
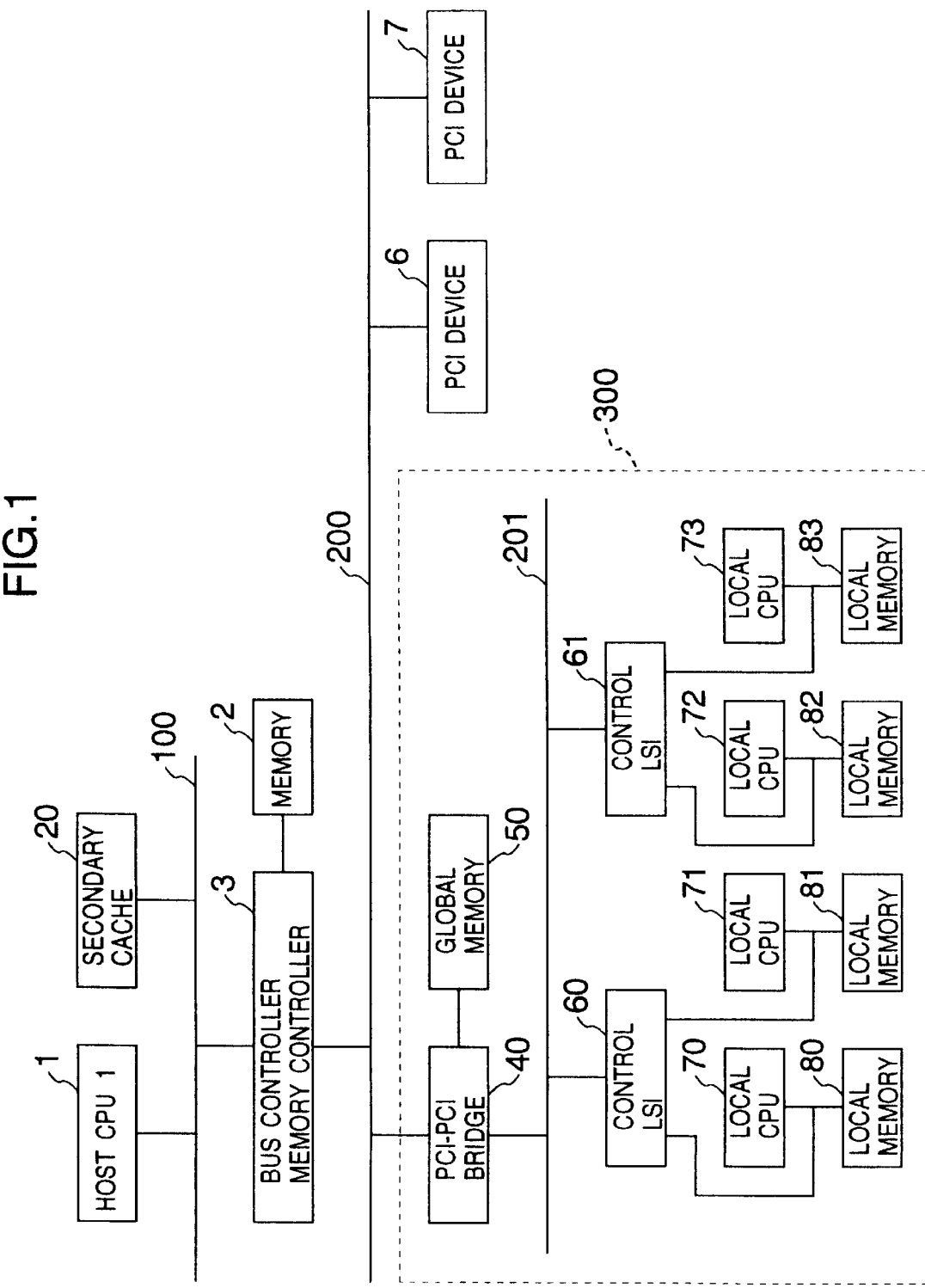
FIG. 1 is a block diagram illustrating the configuration of a computer system having a double bus configuration to which the present invention is applied.
Figure 2A:
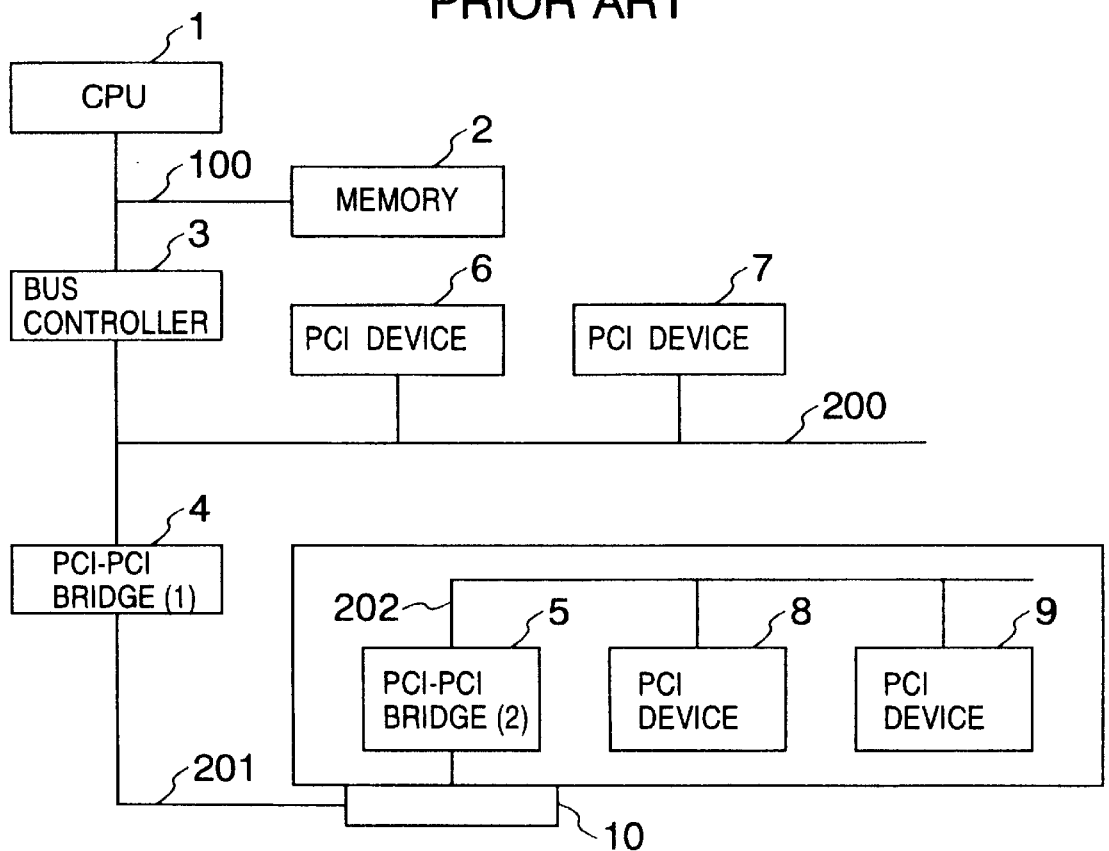
FIG. 2A is a block diagram illustrating the configuration of a conventional computer system having a double bus configuration.
Figure 2B:
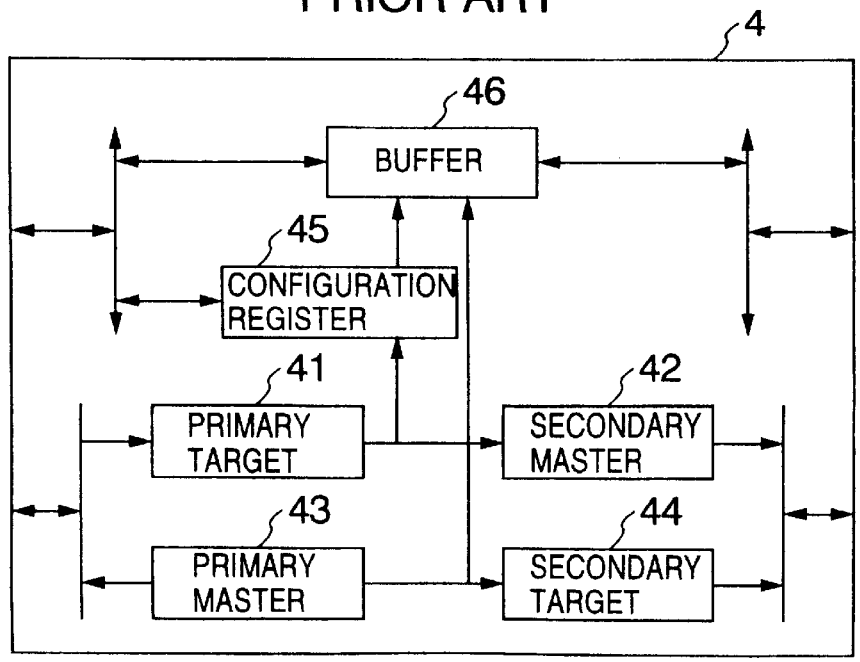
FIG. 2B is a block diagram illustrating a conventional PCI-PCI bridge.

An embodiment of the present invention will hereinafter be described in detail with reference to the accompanying drawings. FIG. 1 illustrates a block diagram of the configuration of a computer system to which the present invention is applied. A portion 300 surrounded by a dotted rectangle indicates an example of an expansion board connected to a first PCI bus in the computer system.

This embodiment will be described below in connection with an example in which a second PCI bus 201 is included on the expansion board 300, and local processors (70, 71, 72, 73) are connected to the second PCI bus 201 through control circuits 60, 61.

The computer system illustrated in FIG. 1 comprises a host CPU 1; a main memory 2; a secondary cache memory 20; a bus/memory controller 3 for performing a conversion from a processor bus 100 of the host CPU 1 to a first PCI bus 200, an access control to the main memory 2, and so on; and a PCI-PCI bridge circuit 40 for relaying the first PCI bus 200 and the second PCI bus 201. PCI devices (6, 7, 60, 61) for controlling a variety of input/output devices are connected to the respective PCI buses.

For example, the PCI devices 6, 7 connected to the first PCI bus 200 may be controllers for controlling a display and a file storage unit (though not illustrated), and the PCI devices 60, 61 connected to the second PCI bus 201 may be control LSI's for interfacing the local CPU's and local memories to the second PCI bus 201, and vice versa.

The control LSI's 60, 61 interface two sets of local CPU's (70, 71, 72, 73) and local memories (80, 81, 82, 83) to the second PCI bus 201, as illustrated. More specifically, the control LSI 160 interfaces a set of the local CPU 70 and the local memory 80 and another set of the local CPU 71 and the local memory 81 to the second PCI bus 201. Similarly, the control LSI 61 interfaces a set of the local CPU 72 and the local memory 82 and another set of the local CPU 73 and the local memory 83 to the second PCI bus 201.

It will be understood that additional control LSI's may be connected to the second PCI bus 201 in a similar combination. Further, the PCI-PCI bridge circuit 40 for relaying the first PCI bus 200 and the second PCI bus 201 is connected to a global memory 50 which is a shared memory commonly accessible from the local CPU's 70–73. The global memory 50 contains a variety of data commonly used by the local CPU's 70–73.

As a preferable application of this embodiment, image processing may be shared by the respective local CPU's. In the simplest usage, a frame of an image is divided into four such that the local CPU's 70–73 are assigned to individually perform image processing on the respective divided sub-frames, and a higher level CPU integrates the individually processed sub-frames to display an entire processed frame of the image on a display connected to the first PCI bus. In this event, data for display is stored in the global memory 50, and the respective CPU's 70–73 sequentially access the data for display stored in the global memory 50.

When a plurality of CPU's are connected to the second CPU bus to establish a multiprocessor configuration, the PCI-PCI bridge having a memory control function will be more effectively utilized.

Figure 3:
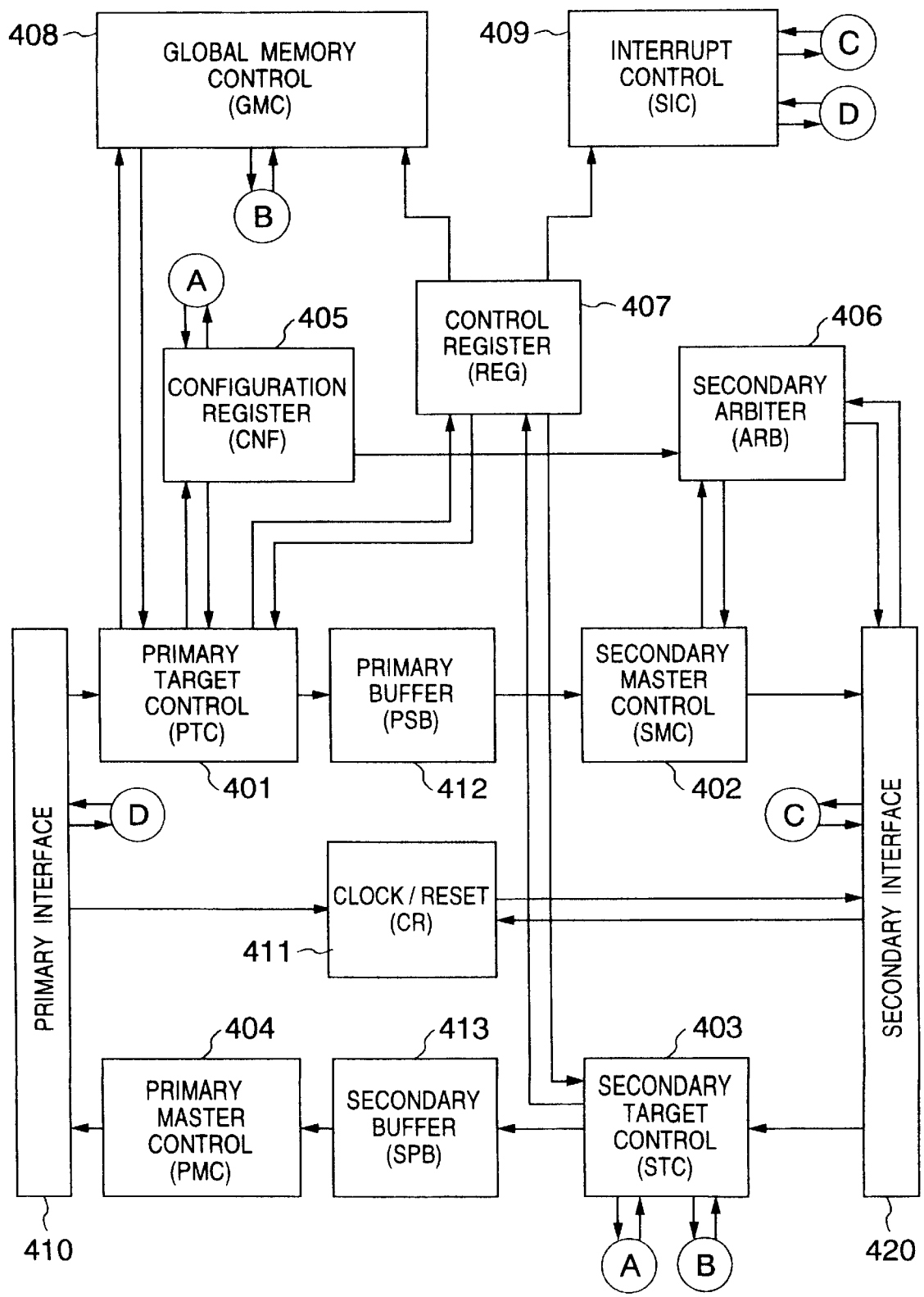
FIG. 3 is a block diagram illustrating the configuration of a PCI-PCI bridge (inter-bus control circuit) according to the present invention.

FIG. 3 is a block diagram illustrating an internal configuration of the PCI-PCI bridge circuit 40. It should be noted first that while each connection from one component to another illustrated in FIG. 3 is represented by a line with an arrow, corresponding alphabet letters each enclosed by a circle are also used to represent such connections in portions where lines with arrows, if drawn, would make the figure excessively complicated.

Referring specifically to FIG. 3, the PCI-PCI bridge circuit 40 includes an interface unit 410 for the interface with the first PCI bus (primary bus) 200; and another interface unit 420 for the interface with the second PCI bus (secondary bus) 201.

The PCI-PCI bridge circuit 40 also includes a primary target control (PTC) unit 401 for responding to an access from the primary bus 200 as a target; a secondary master control (SMC) unit 402 for accessing the secondary bus 201 as a bus master; a secondary target control (STC) unit 403 for responding to an access from the secondary bus 201 as a target; and a primary master control (PMC) unit 404 for accessing the primary bus 200 as a bus master.

A configuration register (CNF) unit 405 is used for setting a PCI space and so on based on the PCI bus standard. Details on the setting of a PCI space and so on based on the PCI bus standard are described in the aforementioned data book, "DEC chip 21050 PCI-to-PCI Bridge Data Sheet", Section 5, from page 5-1 to 5-21.

The PCI-PCI bridge circuit 40 also includes a secondary bus arbiter (ARB) unit 406 for arbitrating secondary bus capture requests from PCI master devices connected to the secondary bus 201; a global memory control (GMC) unit 408 for controlling accesses to the global memory 50; an interrupt control (SIC) unit 409 for generating interrupt signals to the local CPU's 70–73 and the host CPU 1; and a control register (REG) unit 407 for setting control addresses or the like for GMC 408 and SIC 409.

The PCI-PCI bridge circuit 40 further includes a clock/reset control (CR) unit 411 for supplying a clock signal and a reset signal supplied from the primary bus 200 to the secondary bus 201 and to respective blocks in the LSI; a primary buffer 412 for temporarily holding data for an access from the primary bus 200; and a secondary buffer 413 for temporarily holding data for an access from the secondary bus 201.

In the configuration described above, the operation of the PCI-PCI bridge circuit 40, when an access is generated from one of the devices connected to the primary bus 200 (for example, the bus/memory controller 3) and devices connected to the secondary bus 201 (for example, the control LSI 60), will be briefly described with reference to FIGS. 4A and 4B.

Figure 4A:
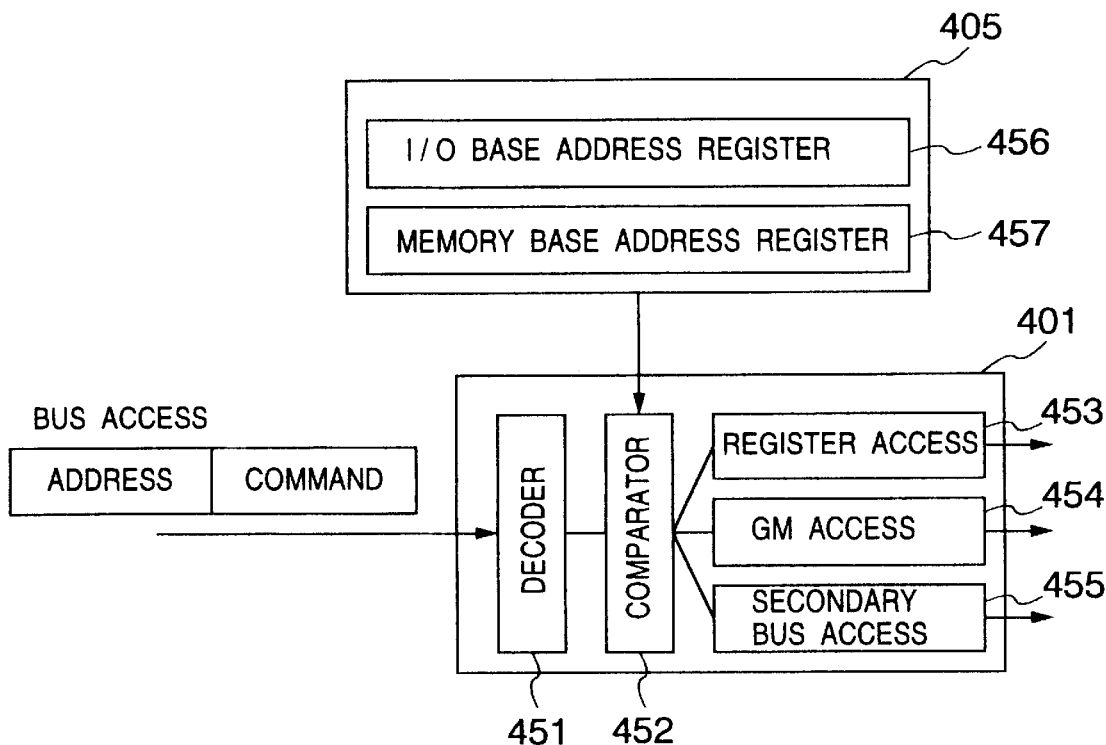
FIGS. 4A and 4B are block diagrams illustrating in detail a primary target control unit 401 and a secondary target control unit 403 shown in FIG. 3, respectively.
Figure 4B:
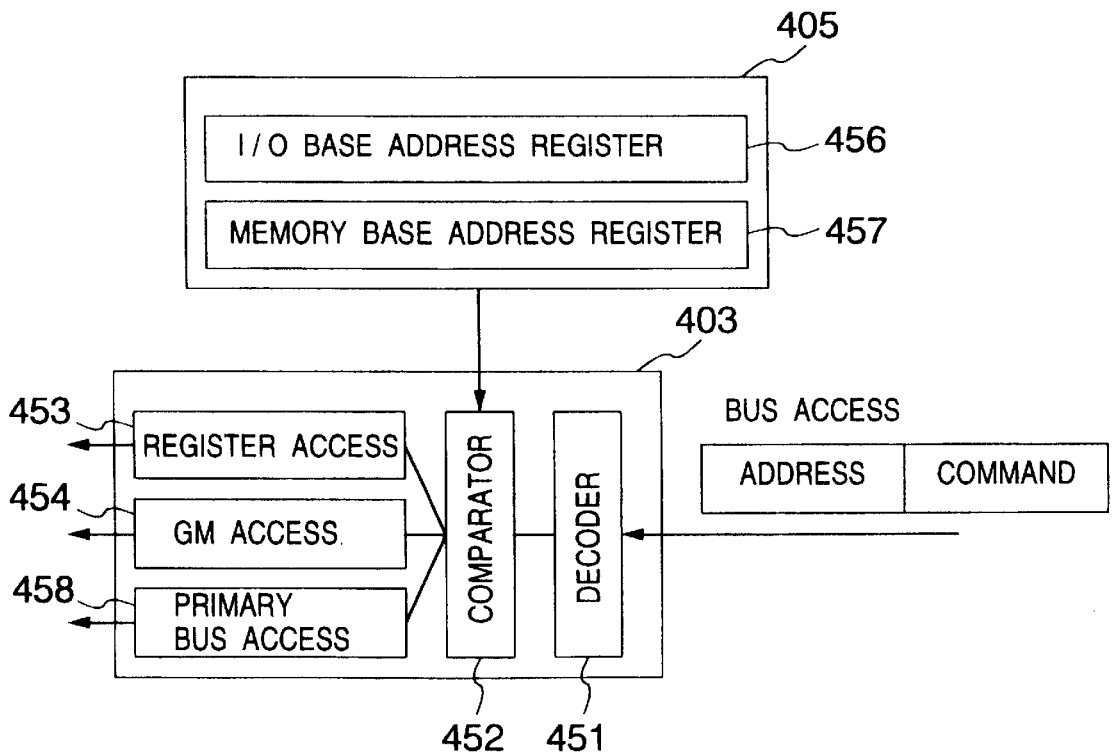

FIGS. 4A and 4B illustrate details of the pertinent components in the PCI-PCI bridge circuit 40 for explaining the operation thereof. Referring specifically to FIGS. 4A and 4B, the primary target control unit 401 includes a decoder circuit 451 for decoding a bus cycle received from the primary interface 410; a comparator circuit 452 for comparing an address decoded by the decoder circuit 45 1 with addresses held in the configuration register 405 to determine the type of the access; a register access unit 453 for processing an access (①) to a register internal to the PCI-PCI bridge circuit (CNF unit 405 and REG unit 407); a GM access unit 454 for processing an access (②) to the global memory 50; and a secondary bus access unit 455 for processing an access (③) to one of the devices connected to the secondary bus 201. The respective processing units are implemented by hardware logics.

CNF unit 405 includes an I/O base address register 456 for holding addresses for indicating in which region of the PCI space the control registers (including devices connected to the first and second buses) are mapped; and a memory base address register 457 for storing addresses for indicating in which region of the PCI space the global memory 50 is mapped.

Next, the operation of the PCI-PCI bridge circuit 40 will be described with reference again to FIGS. 4A and 4B.

When a bus access is generated from the primary bus 200, the primary interface 410 receives the bus access and passes the bus access to PCT unit 401.

PCT unit 401 decodes an address and a command included in the bus access in the decoder circuit 451. The decoded address is compared with addresses stored in the I/O base address register 456 and the memory base address register 457 of the configuration register unit 405. Also, the decoded command is analyzed to determine which of the above-mentioned accesses ①, ②, ③, the received bus access falls under.

If the determination result shows that the received bus access falls under an access to an internal register (①), the processing is passed to the register access unit 453. The register access unit 453 outputs a read/write signal to the register. CNF unit 405 and REG unit 407 write data into and read data from the register based on this read/write signal.

If the determination result shows that the received bus access falls under an access to the global memory (②), the processing is passed to the GM access unit 454. The GM access unit 454 outputs a start signal, addresses in the global memory and pertinent data to GMC unit 408. GMC unit 408 controls read/write of data from/into the global memory 50 based on these signals.

If the determination result shows that the received bus access falls under an access to a device connected to the secondary bus 201, the processing is passed to the secondary bus access unit 455. The secondary bus access unit 455 outputs signals such as a start signal to SMC unit 402, addresses, data, command, and so on. Simultaneously, the bus access accepted by the primary interface unit 410 is stored in PSB unit 412. SMC unit 402, upon receiving the start signal from the secondary bus access unit 455, outputs a request signal to ARB unit 406 for capturing a bus right on the secondary bus 201. Simultaneously, SMC unit 402 fetches the bus access from PSB unit 412.

SMC unit 402, after receiving a grant signal ouputted by ARB unit 406 in response to the request signal, outputs signals associated with the bus cycle including an address, a command, and so on fetched from PSB unit 412 for the secondary bus 201, to the secondary interface unit 420 to generate a bus cycle on the secondary bus 201.

The device, the target of the access, on the secondary bus 201 (for example, the control LSI 60) decodes these signals and responds to the access.

Types of possible accesses from the secondary bus 201 may be ④ an access to a register internal to the PCI-PCI bridge circuit 40 (REC; unit 407); ⑤ an access to the global memory 50; and ⑥ an access to a device connected to the primary bus 200.

FIG. 4B illustrates details of STC unit 403. Since the configuration of STC unit 403 is similar to that of PTC unit 401 illustrated in FIG. 4A, the same circuits are designated the same reference numerals.

The operation performed for processing a bus access from the secondary bus 201 will be described below. When a bus access is generated from the secondary bus 201, the secondary bus interface 420 receives it and passes it to STC unit 420.

STC unit 403 decodes an address and a command in the decoder circuit 451. The comparator circuit 452 determines which of the accesses (④, ⑤, ⑥), the received bus access falls under, and passes the processing to the register access unit 453, the GM access unit 454, or the primary bus access unit 455 in accordance with the determination result.

The processing performed in the respective components are similar to those performed when an access is generated from the primary bus 200. Specifically, if the determination result shows that the received bus access falls under an access to an internal register (④), the register access unit 453 in STC unit 403 outputs a read/write signal to the register. REG unit 407 writes and reads data into and from the register based on this read/write signal.

If the determination result shows that the received bus access falls under an access to the global memory 50 (⑤), the GM access unit: 454 in STC unit 403 outputs a start signal, addresses of the global memory 50 and pertinent data to GMC unit 408. GMC unit 408 controls read/write of data from/into the global memory 50 based on these signals.

If the determination result shows that the received bus access falls under an access to a device connected to the primary bus 200 (⑥), the primary bus access unit 458 in STC unit 403 outputs signals such as a start signal, an address, data, a command, and so on to PMC unit 404, and stores the bus cycle received by the secondary interface unit 420 in SPB unit 413. PMC unit 404, upon receiving the start signal, outputs a request signal to the primary bus 200 for capturing a bus right on the primary bus 200. Then, after receiving a grant signal from the primary bus 200, PMC unit 404 outputs the bus access (address, command, and so on) fetched from SPB unit 413 to the primary bus 200 to generate a bus cycle on the primary bus 200. The device, the target of the access, on the primary bus 200 (for example, the PCI device 6) decodes these signals and responds to the access.

In the operation described above, if an access is generated to the host CPU 1 or any of the local CPU's 70–73, SIC unit 409 performs interrupt processing. SIC unit 409 generates an interrupt signal to the local CPU's 70–73 and the host CPU 1 based on values set in REG unit 407. In REG unit 407, bits are previously set corresponding to individual processors such as the host CPU 1, devices connected to the secondary bus 201, and so on. PTC unit 401 and STC unit 403, upon detecting an access request to an individual processor in the comparator circuit, set a bit corresponding to the requested processor in REG unit 407.

SIC unit 409 monitors REG unit 407 and outputs an interrupt request to a processor (device) corresponding to a set bit.

Each processor, after completing the interrupt processing, returns a notification of the completed interrupt processing to SIC unit 409, thus terminating the interrupt processing.

For an access to the global memory 50 or an access to a device connected to the secondary bus 201 from the primary bus 200, PTC unit 401 may once utilize PSB unit 412 to perform a control for achieving faster access processing in order to limit the latency of the access.

More specifically, during a data write, PCT unit 401, having received the access, returns a ready signal to the primary bus 200 at the time a write operation into PSB 412 unit is ended, and performs write operations into the global memory 50 and a device connected to the secondary bus 201 in parallel.

On the other hand, during a data read, PTC unit 401, in response to an address at which data is first requested, reads an amount of sequential data larger than an amount of data sent to the primary bus 200 at one time, and stores the read data in PSB unit 412, such that data is read from PSB unit 412 without generating read cycles to respective devices if the address in subsequent cycles are continuous.

This results in reducing the number of times each read destination device is accessed and shortening the access latency, thus making it possible to shorten data transfer time.

STC unit 403 may also utilize SPB unit 413 for performing operations similar to those of PTC unit 401 for limiting the access latency when an access to the global memory 50 occurs from the secondary bus 201 or an access to a device connected to the primary bus 200 occurs.

As described above, the bridge circuit according to the present invention enables a computer system to have the configuration of a plurality of PCI buses as well as the configuration of a memory control mechanism common to devices connected to a second PCI bus and an interrupt control mechanism at a low cost.

What is claimed is:

1. A computer system having a double bus configuration comprising:

a higher level processing unit;

a first bus for transmitting signals between said higher level processing unit and respective devices;

a second bus;

devices connected to said second bus; and an inter-bus control circuit for inter-connecting said first bus and said second bus, wherein said computer system also comprises a global memory connected to said inter-bus control circuit, and said inter-bus control circuit comprises:

a first interface for communicating signals with said first bus;

a second interface for communicating signals with said second bus;

a memory controller for controlling said global memory; and a control circuit for determining whether a bus cycle received by said first interface targets a device connected to said second bus or is an access to said global memory, and relying on the determination result to force said memory controller to access said global memory or to receive said bus cycle generated on said one bus as a target and generate a bus cycle to the other bus as a bus master.

2. A computer system according to claim 1, wherein said first and second buses are PCI buses.

3. A computer system according to claim 1, wherein:

said inter-bus control circuit includes a register for storing addresses for accessing devices connected to said second bus and an address for accessing said global memory, and said control circuit references said register to compare an address included in said bus cycle with the addresses stored in said register and determines whether a bus cycle received by said first interface targets a device connected to said second bus or is an access to said global memory.

4. A computer system according to claim 1, wherein:
said inter-bus control circuit includes an interrupt control circuit for controlling an interrupt to each device connected to said second bus.

5. A computer system according to claim 4, wherein:
when the result of the determination indicates an access to a device connected to said second bus, said control circuit provides said interrupt control circuit with information for specifying one device within the respective devices to force said interrupt control circuit to perform interrupt processing.

6. An inter-bus control circuit having a configuration comprising:
a first interface for communicating signals with a first bus;
a second interface for communicating signals with a second bus;
a control circuit for receiving a bus cycle generated on the first bus as a target and generating a bus cycle to the second bus as a bus master; and
a memory controller for controlling a global memory connected to said inter-bus control circuit,
wherein said control circuit determines whether a bus cycle received by said first interface targets a device connected to said second bus or is an access to said global memory, and relies on the determination result to force said memory controller to access said global memory or to generate a bus cycle to the device connected to said second bus.

7. An inter-bus control circuit according to claim 6, wherein said first and second buses are PCI buses.

8. An inter-bus control circuit according to claim 6, further comprising a register for storing addresses for accessing devices connected to said second bus and an address for accessing said global memory,
wherein said control circuit references said register to compare an address included in said bus cycle with the addresses stored in said register and determines whether the bus cycle received by said first interface targets a device connected to said second bus or is an access to said global memory.

9. An inter-bus control circuit according to claim 6, further comprising an interrupt control circuit for controlling an interrupt to each device connected to said second bus.

10. An inter-bus control circuit according to claim 9, wherein:
when the result of the determination indicates an access to a device connected to said second bus, said control circuit provides said interrupt control circuit with information for specifying one device within the respective devices to force said interrupt control circuit to perform interrupt processing.

11. An inter-bus control circuit according to claim 6, wherein said inter-bus control circuit is a one-chip integrated circuit.

12. An inter-bus control circuit having a configuration comprising:
a first interface for communicating signals with a first PCI bus;
a second interface for communicating signals with a second PCI bus;
a control circuit for receiving a bus cycle generated on one PCI bus as a target and generating a bus cycle to a PCI device connected to the second PCI bus as a bus master; and
an interrupt control circuit for controlling an interrupt to a local CPU connected to the second PCI bus via the PCI device,
wherein said control circuit decodes a bus cycle received from said first or second PCI bus, and when said bus cycle targets the local CPU connected to said second PCI bus via the PCI device, said interrupt control circuit performs interrupt processing to the local CPU.

13. An inter-bus control circuit according to claim 12, wherein said second PCI bus connects plural ones of said local CPUs via plural ones of the PCI devices, and said control circuit specifies one of said plural local CPUs as the local CPU that is the target of said bus cycle for the interrupt processing by the interrupt control circuit.

14. An inter-bus control circuit according to claim 12, further comprising a register for storing bits corresponded to respective devices connected to said second bus,
wherein said bus cycle is decoded, and when said bus cycle targets a device connected to said second bus, a bit in said register corresponding to said device is set, and
said interrupt control circuit is informed of said device by monitoring said register.

15. An inter-bus control circuit according to claim 12, further comprising a memory controller for controlling a global memory connected to said inter-bus control circuit,
wherein said control circuit determines whether the bus cycle received by said first interface targets a device connected to said second bus or is an access to said global memory, and relies on the determination result to force said memory controller to access said global memory or to generate a bus cycle to the device connected to said second bus.

16. An inter-bus control circuit according to claim 15, further comprising a second register for storing addresses for accessing respective devices connected to said second bus and an address for accessing said global memory,
wherein said control circuit compares an address included in said decoded bus cycle with addresses in said second registers to determine whether said bus access targets a device connected to said second bus or is an access to said global memory.

17. An inter-bus control circuit according to claim 12, wherein said inter-bus control circuit is a one-chip integrated circuit.

18. An inter-bus control circuit having a configuration comprising:
a first interface for communicating signals with a first bus operating in accordance with a standard;
a second interface for communicating signals with a second bus operating in accordance with said standard;
a control circuit for receiving a bus cycle generated on one said bus as a target and generating a bus cycle to a device, which has an interface that operates in accordance with said standard and is connected to the said second bus as a bus master; and
an interrupt control circuit for controlling an interrupt to a local CPU connected to the second bus via the device,
wherein said control circuit decodes a bus cycle received from said first or said second bus, and when said bus cycle targets the local CPU connected to said second bus via the device, said interrupt control circuit performs interrupt processing to the local CPU.

19. An inter-bus control circuit according to claim 18, wherein said second bus connects a plurality of local CPUs via a plurality of said devices, and said control circuit specifies one local CPU of said plurality as the target of said bus cycle for the interrupt processing by the interrupt control circuit.

20. An computer system having a double bus configuration, comprising:

a higher level processing unit;

a first bus operating in accordance with a standard for transmitting signals between said higher level processing unit and respective devices;

a second bus operating in accordance with said standard;

a first interface for communicating signals with said first bus;

a second interface for communicating signals with said second bus;

a control circuit for receiving a bus cycle generated on said first bus as a target and generating a bus cycle to a device that has an interface based on said standard of said first and second bus, said device being connected to said second bus as a bus master; and an interrupt control circuit for controlling an interrupt to a local CPU connected to said second bus via the device, wherein said control circuit decodes a bus cycle received from said first or said second bus, and when said bus cycle targets the local CPU connected to said second bus via the device, said interrupt control circuit performs interrupt processing to the local CPU.

21. A computer system according to claim 20, wherein said local CPU is an image processing processor.

22. A computer system according to claim 20, wherein said local CPU is one of four local CPUs, and wherein a frame of an image is divided into four sub-frames such that each of said local CPUs is assigned to individually perform image processing on one of said sub-frames.

* * * * *